United States Patent
Organek et al.

[11] Patent Number: 5,810,141
[45] Date of Patent: Sep. 22, 1998

[54] DRIVELINE CLUTCH WITH UNIDIRECTIONAL APPLY BALL RAMP

[75] Inventors: Gregory J. Organek, Detroit; David M. Preston, Clarkston, both of Mich.

[73] Assignee: Eaton Corporation, Cleveland, Ohio

[21] Appl. No.: 766,838

[22] Filed: Dec. 13, 1996

[51] Int. Cl.[6] .............................. F16D 13/04; F16D 11/00; F16D 19/00
[52] U.S. Cl. ...................... 192/35; 192/54.52; 192/84.7; 192/93; 192/40; 475/149
[58] Field of Search ..................... 475/154, 149, 475/318, 5, 151, 453; 192/54.5, 35, 84.7, 54.52, 93

[56] References Cited

U.S. PATENT DOCUMENTS

| | | | |
|---|---|---|---|
| 5,078,248 | 1/1992 | Yesnik | 192/84.7 X |
| 5,441,137 | 8/1995 | Organek et al. | 192/93 A |
| 5,469,948 | 11/1995 | Organek et al. | 192/35 |
| 5,482,512 | 1/1996 | Stevenson | 475/5 |
| 5,503,602 | 4/1996 | Dick | 192/35 X |
| 5,651,437 | 7/1997 | Organek et al. | 192/84.7 X |

*Primary Examiner*—Charles A. Marmor
*Assistant Examiner*—Marcus Charles
*Attorney, Agent, or Firm*—Loren H. Uthoff, Jr.; Howard D. Gordon

[57] ABSTRACT

A ball ramp mechanism having a control ring acting with an actuation ring to apply a clamping force on a driveline clutch during both a vehicle driving mode and a vehicle coast mode using a planetary gearset acting with a one-way clutch between a sun gear and meshing planetary gears to define rotation of the control ring with respect to the actuation ring in a direction tending to further activate the ball ramp mechanism. In the vehicle drive mode the planetary gearset is locked by the one-way clutch and in a vehicle coast mode the one-way clutch releases and the planetary gearset rotates the control ring through a coil pole in a direction to further activate the ball ramp mechanism.

11 Claims, 3 Drawing Sheets

DRIVELINE CLUTCH WITH UNIDIRECTIONAL APPLY BALL RAMP

BACKGROUND OF THE INVENTION

The present invention relates to a vehicle driveline clutch and, more particularly, to a driveline clutch where a friction disc is clamped to an engine flywheel using a ball ramp actuator where a one-way clutch and a planetary gearset are used to provide both drive and coast driveline clutch lock-up.

Driveline clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the clutch.

Efforts to automate the operation of the clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs based on operating conditions to determine when and in what manner the driveline clutch should be activated, or deactivated.

The use of a ball ramp actuator to load a clutch pack in a vehicle driveline differential is known. U.S. Pat. Nos. 4,805, 486 and 5,092,825, the disclosures of which are hereby incorporated by reference, disclose limited slip differentials where a clutch pack is loaded in response to the activation of a ball ramp actuator initiated by rotation of a servo motor or a solenoid driven brake shoe on an activating ring. The advantage of the ball ramp mechanism over other actuators is that it converts rotary motion into axial motion with a very high force amplification, often 100:1 or greater. A ball ramp actuator has also been utilized in a vehicle transmission to engage and disengage gearsets by loading a gear clutch pack in response to a signal as disclosed in U.S. Pat. No. 5,078, 249, the disclosure of which is hereby incorporated by reference.

In both of these vehicle applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an actuation ring thereby causing rolling elements to engage ramps in the control and actuation ring which increase the axial movement and clamping force on the clutch pack.

It is also known to use a ball ramp actuator to load a vehicle master clutch as disclosed in U.S. Pat. Nos. 1,974, 390; 2,861,225; 3,000,479; 5,441,137; 5,469,948; 5,485,904 and 5,505,285, the disclosures of which are hereby incorporated by reference. One problem with the use of a ball ramp actuator to supply the vehicle driveline clutch clamping force is that the mechanics of prior art unidirectional ball ramp mechanisms result in a loss of clamping force when the vehicle is in a coast mode. Once the engine power is reduced and the driveline is actually overrunning the engine (coast mode), the prior art ball ramp actuator with single ramp unidirectional actuation will disengage the clutch thereby eliminating the potential for engine braking of the vehicle.

In other words, this type of ball ramp actuated clutch using a unidirectional ball ramp having only a single ramp angle, will cause the clutch to disengage when the engine is not supplying rotational energy into the transmission such as when the vehicle is coasting. When coasting, the flywheel is no longer supplying rotational energy to either the transmission or to the ball ramp actuator. In this circumstance, the relative rotation of the actuation ring and control ring has been reversed such that the ball ramp axial displacement is collapsed thereby allowing the pressure plate to pull away from the clutch disc. The result is that the engine is disengaged from the transmission and any engine braking effect is eliminated.

A bidirectional ball ramp actuated clutch is disclosed in U.S. Pat. Nos. 2,937,729 and 5,505,285. Using this more expensive and complicated technology, the ball ramp actuator incorporates bidirectional ramps which provide activation when there is relative rotation between the control ring and the actuation ring in either direction. However, the ball ramp must transition through the nonactivated state which will result in temporary undesirable clutch slippage and the components are more expensive to fabricate than a unidirectional unit. Also, a bidirectional ball ramp will have reduced rotational travel between the control ring and the actuation ring in a given package size as compared to a unidirectional ball ramp mechanism. Thus, a unidirectional ball ramp mechanism is preferred if it can be made to activate in both vehicle drive and coast operating modes.

The ball ramp actuator comprises a plurality of roller elements, a control ring and an opposed actuation ring where the actuation ring and the control ring define at least three opposed single ramp surfaces formed as circumferential semi-circular grooves, each pair of opposed grooves containing one roller element. A plurality of thrust rollers (or other type of thrust bearing) are interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator. The control clutch can be similar to those commonly used for vehicle air conditioning compressors.

SUMMARY OF THE INVENTION

The present invention is characterized by a flywheel driven by a prime mover and a transmission input shaft coupled through a ball ramp actuated clutch. The ball ramp mechanism has a plurality of unidirectional variable depth grooves (ramps) and an actuation ring having single direction variable depth grooves at least partially opposed and substantially similar in geometry to those of the control ring. Examples of ball ramp actuator clutch systems are shown in U.S. Pat. Nos. 1,974,390; 2,861,225; 2,937,729; 3,000,479; 5,485,904 and 5,505,285. The actuation ring is prevented from counter rotating upon clutch lock-up in the vehicle coast mode through the use of a one-way clutch. A planetary gearset is used to allow the ball ramp actuator to increase the clamping force on the clutch friction disc in the coast mode. Thus, using the present invention, the ball ramp mechanism does not transition through the nonactivated state when the vehicle goes from a drive to a coast mode and clutch slippage is reduced.

An electromagnetic coil is used to activate a control clutch which frictionally couples the control ring through the planetary gearset to the transmission input shaft. When energized by the coil, the ball ramp mechanism provides a clamping force on the clutch friction disc where the amplitude of the clamping force immediately increases whenever there exists a rotational speed differential between the input flywheel and the input shaft of the vehicle transmission. According to the present invention, the amplitude of the clamping force is held at a given level as long as the coil is energized by action of a one-way clutch so that when the vehicle enters a coasting mode where the engine is braking as opposed to driving the vehicle, the ball ramp actuator remains fully activated. Clutch slippage in the drive mode will cause the ball ramp mechanism to increase the clamping force on the clutch disc. Also, in the coasting mode, if for some reason there is clutch slippage, the planetary gearset provides for additional relative rotation between the control ring and the actuation ring in the proper direction to increase the clamping force on the clutch friction plate.

One provision of the present invention is to prevent a ball ramp actuated clutch from disengaging when the input torque is reversed.

Another provision of the present invention is to prevent a ball ramp actuated clutch having unidirectional ramps from disengaging when the driveline torque is in a coast mode by locking the rotational orientation between a control ring and an actuation ring using a one-way clutch.

Another provision of the present invention is to allow a ball ramp actuated clutch having unidirectional ramps to increase its engagement level when the driveline torque is in a coast mode utilizing a planetary gearset.

Another provision of the present invention is to allow a driveline clutch actuated by a ball ramp actuator having unidirectional ramps to increase its actuation force when the transferred driveline torque reverses direction utilizing a planetary gearset incorporating a one-way clutch acting between the control ring and the transmission input shaft.

Still another provision of the present invention is to allow a driveline clutch actuated by a ball ramp actuator having unidirectional ramps to increase its actuation force when the transferred driveline torque reverses direction utilizing a planetary gearset acting between the control ring and the transmission input shaft where a one-way clutch prevents reverse rotation of the planetary gears relative to the transmission input shaft.

DETAILED DESCRIPTION OF THE PREFERRED EMBODIMENT

Figure 1:
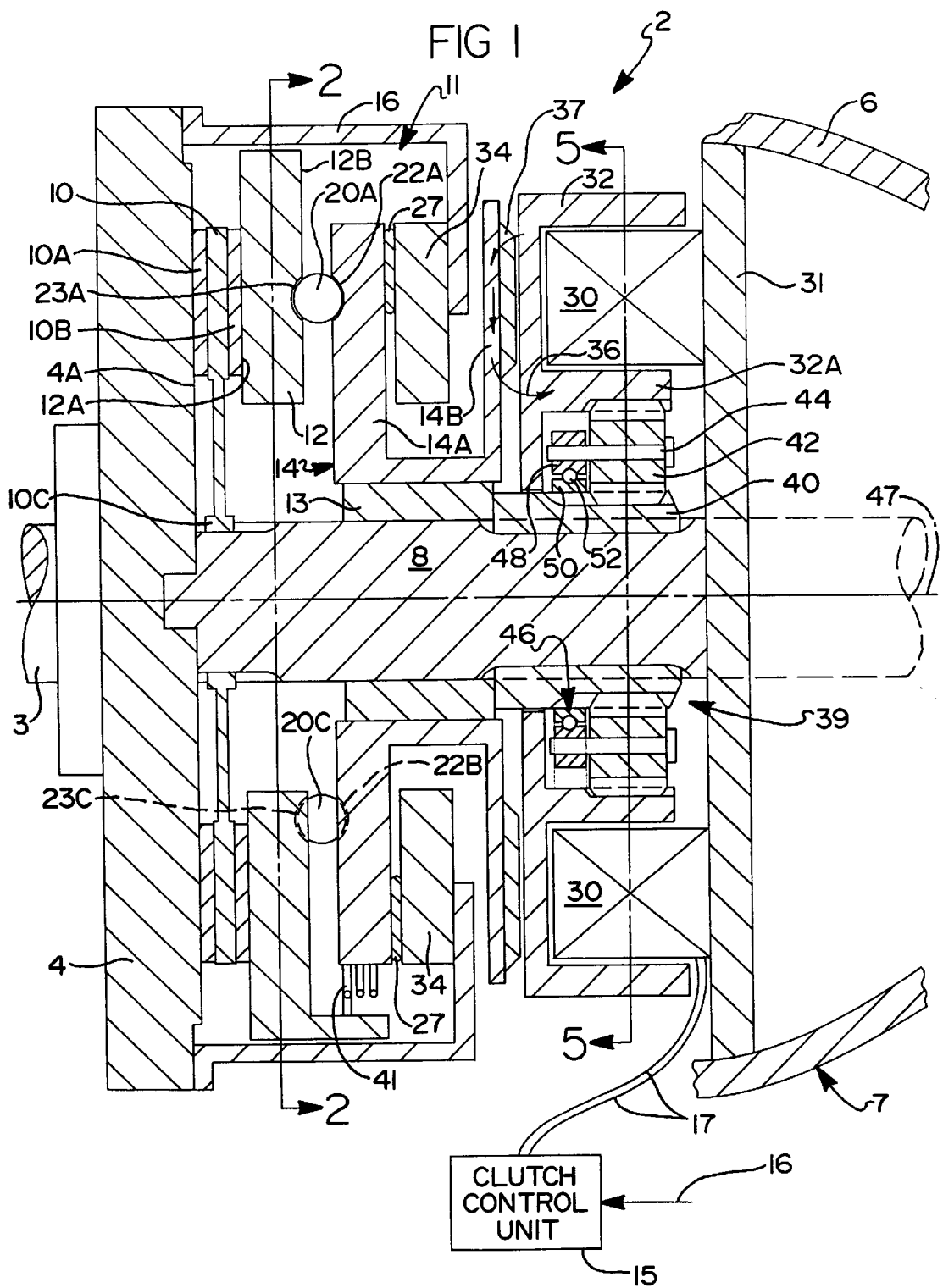
FIG. 1 is a partial cross-sectional view of the ball ramp actuator of the present invention.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. For example, the terms "forward" and "rearward" will refer to directions forward and rearward of the clutch assembly as normally mounted in a vehicle. The terms "rightward" and "leftward" will refer to directions in the drawings in connection with which the terminology is used. The terms "inwardly" and "outwardly" will refer to directions toward and away from respectively, the geometric center of the apparatus. The terms "upward" and "downward" will refer to directions as taken in the drawings in connection with which the terminology is used. All foregoing terms mentioned above include the normal derivatives and equivalents thereof.

Referring now to the drawings, which are not intended to limit the present invention, FIG. 1 is an axial cross-sectional view of a main driveline clutch assembly 2 of the type in which the present invention may be utilized. The main driveline clutch assembly 2 includes a flywheel 4 rotatably driven by a prime mover (not shown) such as an internal combustion engine by its output crankshaft 3 which is coupled to a transmission 7 by a clutch assembly 2. A bellhousing 6 surrounds the flywheel 4 having a flywheel friction surface 4A and supports the transmission 7 including the transmission input shaft 8 which extends to nonrotatably engage a clutch disc 10 having friction pad 10A and friction pad 10B through splines 10C at the left end of the transmission input shaft of where the transmission input shaft 8 then extends rightward to drive the transmission gearing. An actuation ring 12, which also functions as a pressure plate and is rotatably connected to the pressure plate housing 16, is used to clamp the clutch disc 10 through the attached friction pads 10A and 10B to the flywheel 4 at the flywheel friction surface 4A thereby transferring the rotational power from the prime mover to the transmission 7 through the transmission input shaft 8 and eventually to the rest of the vehicle driveline.

In prior art systems, the clutch pressure plate is forced toward the flywheel using a plurality of loading springs. When the operator wishes to disengage the clutch disc, a mechanical release mechanism is activated by the operator's foot and leg overcoming the force of the springs thereby allowing the clutch disc to slip relative to the flywheel. It should be understood, however, that neither the activation springs nor the mechanical release mechanism are features of the present invention. According to the present invention, a ball ramp mechanism 11 is used to force the actuation ring 12 toward the flywheel 4 which is controlled by the clutch control unit 15 electronically taking the place of an operator during transmission shifting sequences.

Figure 2:
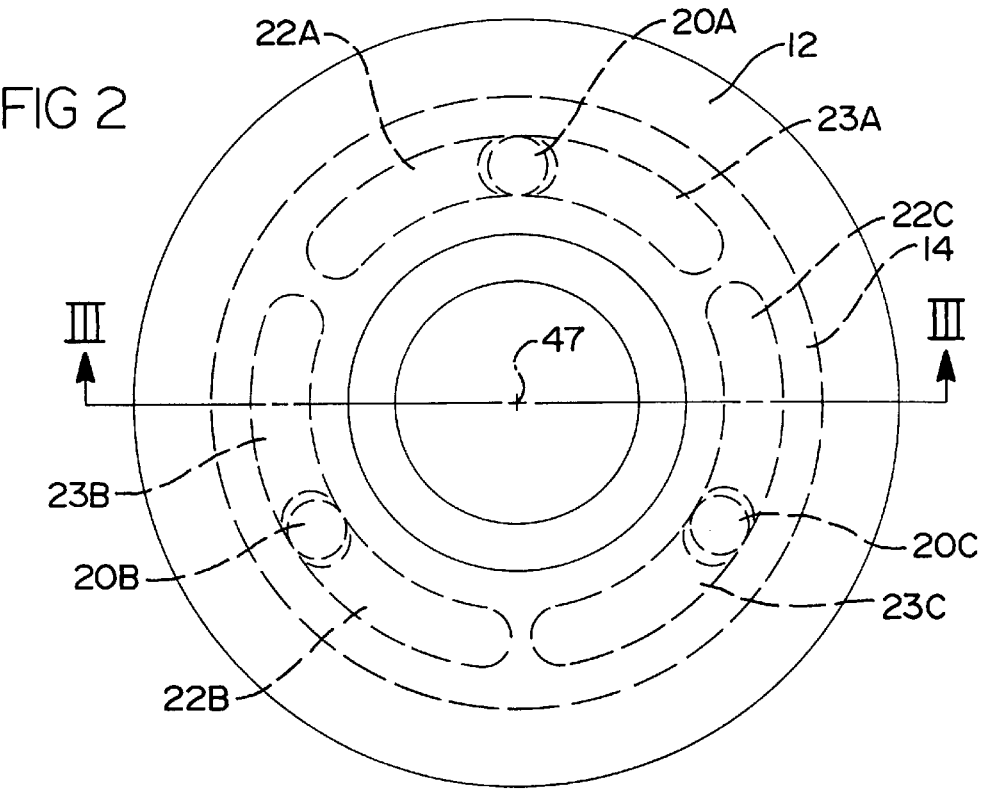
FIG. 2 is an axial cross-sectional view of the ball ramp mechanism of the present invention taken along line II—II of FIG. 1.

The clutch bellhousing 6 partially encloses the clutch assembly 2 including the ball ramp mechanism 11 of the present invention. Ball ramp actuators that react a control ring to ground are well known in the art and have been used to load transmission gear clutches as disclosed in U.S. Pat. No. 5,078,249, and differential clutch packs as disclosed in U.S. Pat. No. 5,092,825 where a ball ramp control ring is reacted against case ground by a coil or motor. In essence, relative rotational motion between the control ring 14 and the actuation ring 12 causes one or more rolling elements 20A, 20B and 20C, which can be spherical elements or cylindrical rollers, to be moved along a like number of opposed ramps 22A, 22B and 22C formed in the control ring 14 and ramps 23A,23B and 23C formed in the actuation ring 12 respectively. Ramps 22A,22B,22C,23A,23B and 23C have variable axial depth which is unidirectional. FIG. 2 illustrates this geometry with more detail and precision, reference to which is made subsequently.

A plurality of thrust elements 27 reacting against the thrust ring 34, which can be any type of suitable thrust bearing, are used to contain the axial forces generated by the ball ramp rolling elements 20A,20B and 20C as they engage the ramps 22A,22B,22C,23A,23B and 23C in the control ring 14 and the actuation ring 12 respectively. The thrust ring 34 is connected to the pressure plate housing 16. Rotation of the control ring 14 relative to the actuation ring 12 causes the actuation ring 12 to move axially toward the flywheel 4 thereby clamping the clutch disc 10 between the actuation ring 12 and the flywheel 4. The actuation ring 12 is rotatably connected to the pressure plate housing 16 but can move axially with respect thereto. Attached to the control ring 14 is a somewhat flexible annular ring extension 14B which supports a primary control friction disc 37 made of a friction material. The ball ramp section 14A of the control ring 14 contains the ramps 22A, 22B and 23C and is rotatably supported by the transmission input shaft 8 by bearing 13. The control friction disc 37 is drawn against the coil pole 32 when the coil 30 is energized by the clutch control unit 15 through connectors 17. The annular electrical coil 30 encircles the transmission input shaft 8 and is supported by the transmission case extension 31 attached to the transmission 7. The electrical coil 30 is positioned in close proximity to the coil pole 32 separated by an air gap from the coil 30 and is rotatably supported on the transmission input shaft 8 on sun gear 40. The electrical coil 30 is positioned to be partially enclosed by the coil pole 32 and is separated from it by a small air gap. The coil 30 is mounted to the transmission case extension 31 and therefore held stationary while the coil pole 32 rotates according to the action of the planetary gearset 39. The coil 30 generates an electromagnetic flux 36 shown by arrows in FIG. 1 which travel through the coil pole 32 into the ring extension 14B and back through the coil pole 32 into the coil 30. This electromagnetic flux 36 creates a force tending to draw the ring extension 14B into the coil pole 32 thereby creating a frictional force through contact of the friction disc 37 on coil pole 32 and a resulting torque in the control ring 14 (assuming a rotational speed differential between the flywheel 4 and the transmission input shaft 8) which activates the ball ramp mechanism 11 through the one-way clutch 46 which is loaded in a locking direction.

When the clutch disc 10 is unclamped or starts to slip due to excessive torque supplied by the prime mover (engine) through the flywheel 4, there is relative rotation between the control ring 14 and the actuation ring 12 thereby forcing the rings 12 and 14 axially further apart (as described in further detail infra) thereby increasing the clamping force of the actuation ring 12 on the clutch disc 10 at the friction pad 10B and between the friction pad 10A and the flywheel 4. This occurs through a small range of rotational motion of the control ring 14 relative to the actuation ring 12 and provides an automatic, virtually instant, clamping force adjustment should any rotational slipping occur between the flywheel 4 and the transmission input shaft 8.

According to the present invention, once the clutch assembly 2 is locked-up, the coil pole 32 rotates at the same speed as the flywheel 4 and minimal parasitic electrical power is required to be delivered to the coil 30 to maintain lock-up of clutch assembly 2. Using the teaching of the prior art, the control ring 14 can be reacted against a ground surface, such as the clutch bellhousing 6, although continuous slipping would occur between the control ring 14 through the control friction disc 37 and the coil pole 32 resulting in high parasitic energy losses and no automatic activation of the ball ramp mechanism 11 upon clutch slip. As illustrated in the present application, by attaching the control ring 14 to the transmission input shaft 8 through the control friction disc 37 and the planetary gearset 39 controlled by action of a one-way clutch 46, very little clutch slip occurs when the ball ramp mechanism 11 is energized thereby minimizing energy losses. Also, the reaction time to even minimal slipping of the clutch disc 10 when in either the vehicle drive or coast mode using the present invention is virtually instantaneous since slippage of the clutch disc 10 results in relative motion between the actuation ring 12, and the control ring 14 through the control clutch 37 and the planetary gearset 39 on the control ring 14 side and through the pressure plate housing 16 to the actuation ring 12. The actuation ring 12 is rotationally coupled to the clutch pressure plate housing 16 which is in turn connected to the flywheel 4 all rotating together.

The centering spring 41 functions to control the rotational position of the control ring 14 relative to the actuation ring 12 when the electrical coil 30 is not energized such that very little axial force is applied through the ball ramp mechanism 11, especially when the engine is rapidly accelerated causing inertia forces of the components to come into play and no clutch activation is desired. The centering spring 41 is shown as a torsional spring only on one side of the ball ramp mechanism 11 but actually extends to encircle the control ring 14 and has one end attached to the control ring 14 and a second end attached to the actuation ring 12. Rotation of the control ring 14 relative to the actuation ring 12 causes the centering spring 41 to be stressed and to thereby generate a centering force between the actuation ring 12 and the control ring 14 that tends to return them to a rotational orientation where no axial force is generated by the ball ramp mechanism 11.

A plurality of pressure plate springs (not shown) act to pull the actuation ring 12 away from the clutch friction disc 10 and the flywheel 4 by acting as spring elements between the pressure plate housing 16 and the actuation ring 12 thereby biasing the actuation ring 12 away from the flywheel 4. The pressure plate housing 16 is attached to the flywheel 4 such that the actuation ring 12 rotates with the flywheel 4 but can move axially relative to the flywheel 4 as controlled by action of the ball ramp mechanism 11 acting to compress the pressure plate springs.

A planetary gearset 39 is disposed between coil pole 32 and the transmission input shaft 8. The planetary gearset 32 is comprised of a sun gear 40 driven by the transmission input shaft 8 and meshing with a plurality of planet gears 42 which each rotate on a respective support pin 44. The planet gears 42 then mesh with the coil pole 32 at extension ring 32A. The coil pole 32 is rotatably supported on the sun gear 40.

The planet gears 42 are circumferentially spaced from one another by carrier ring 48. A one-way clutch 46 is disposed between the carrier ring 48 and the sun gear 40 and comprises the carrier ring 48 acting through clutch elements 52 to the inner ring 50. The one-way clutch 46 prevents the control ring 14 from rotating relative to the actuation ring 12 in a direction that would deactivate the ball ramp mechanism 11 as long as the coil 30 is energized by preventing rotation of the carrier ring 48 relative to the sun gear 40 in that direction.

Upon energization of the coil 30, the planetary gearset 39 and the one-way clutch 46 provide for relative rotation of the control ring 14 and the actuation ring 12 only in a direction which results in further activation of the ball ramp mechanism 11 and increased clamping force on the clutch disc 10 irregardless of the operational mode of the vehicle and torque flow through the driveline.

Axial forces generated by the ball ramp mechanism 11 are transmitted by the thrust elements 27 into the thrust ring 34 which is attached to the flywheel 4 through the pressure plate housing 16. In the opposite direction, the force generated by the ball ramp mechanism 11 is transmitted to the clutch disc 10 and the flywheel 4.

The one-way clutch 46 is positioned to operate between the coil pole extension ring 32A of the coil pole 32 and the sun gear 40 of the planetary gearset 39. The sun gear 40 is driven by the transmission input shaft 8 and then meshes with planet gears 42 which then in turn mesh with the pole extension ring 32A of the coil pole 32 which is electromagnetically and frictionally coupled to the control ring 14 of the ball ramp mechanism 11. A coil 30 positioned adjacent to the coil pole 32 creates an electromagnetic field when the coil 30 is energized with an electrical current from the clutch control unit 15 through connecting leads 17. Additional vehicle electronic systems provide inputs via line 16 to the clutch control unit 15.

When the engine is supplying power to the vehicle driveline herein referred to as a drive mode, the coil 30 is energized and the ring extension 14B is electromagnetically coupled to the coil pole 32 thereby rotationally coupling the transmission input shaft 8 to the control ring 14 through the sun gear 40 and planet gears 42 of the planetary gearset 39. Any relative rotation between the transmission input shaft 8 and the flywheel 4 results in relative rotation between the control ring 14 and the actuation ring 12 in a direction that results in an increase in separation 66 (see FIG. 4) between the control ring 14 and the actuation ring 12. The one-way clutch 46 prevents the planetary gearset 39 from back driving when the engine power is reduced. As long as the coil 30 remains energized, the ball ramp mechanism 11 is not allowed to deactivate since the control ring 14 is held rotationally stationary relative to the actuation ring 12 by the one-way clutch 46 acting on the planet gears 42 and sun gear 40 of the planetary gearset 39.

When the vehicle transitions to the coast mode, the driveline torque transfer reverses to a state where the wheels are driving and the engine is being driven and thus braking the motion of the vehicle. Unless the ball ramp mechanism 11 has dual acting ramps formed in the control ring 14 and the actuation ring 12 (see U.S. Pat. Nos. 2,937,729 and 5,505,285) the unidirectional ball ramp mechanism 11 will normally release and not allow for engine braking when utilizing prior art systems. According to the present invention, a planetary gearset 39 along with the one-way clutch 46 is positioned between the transmission input shaft 8 and the control ring 14 so that when the vehicle is in a coast mode, relative rotation between the transmission input shaft 8 and the flywheel 4 causes the ball ramp mechanism 11 to become increasingly activated. In the coast mode the one-way clutch 46 does not lock, and results in rotation of the planet gears 42 relative to the sun gear 40 thereby reversing the rotation of the coil pole relative to the transmission input shaft 8 which will further activate the ball ramp mechanism 11. Thus, the present invention provides the feature that whenever the coil 30 is energized and there is relative rotation between the transmission input shaft 8 and the flywheel 4 in either direction, the ball ramp mechanism 11 is increasingly activated and the clamping force on the clutch disc 10 is increased when there is any difference in the rotational speed of the flywheel 4 and the transmission input shaft 8. The one-way clutch 46 provides a method to prevent the ball ramp mechanism 11 from deactivating whenever the coil 30 is energized by freezing the planetary gearset 39.

Figure 3:
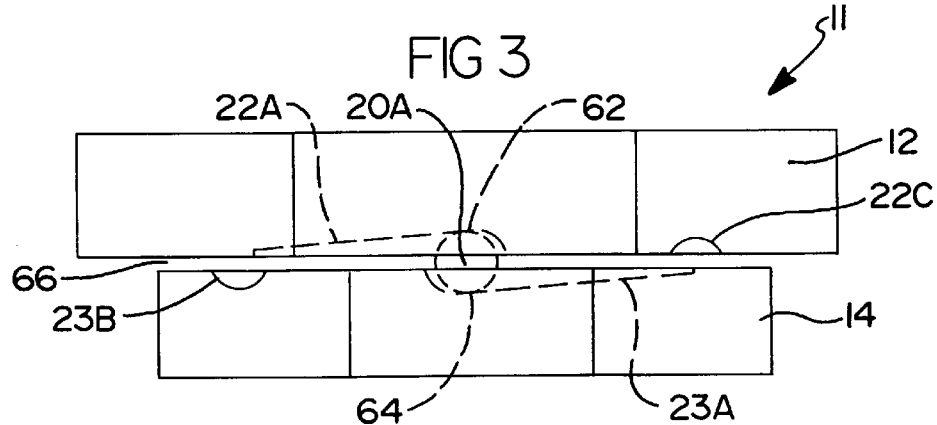
FIG. 3 is a cross-sectional view of the ball ramp mechanism of the present invention taken along line III—III of FIG. 2 with the ball ramp mechanism in a nonenergized state.
Figure 4:
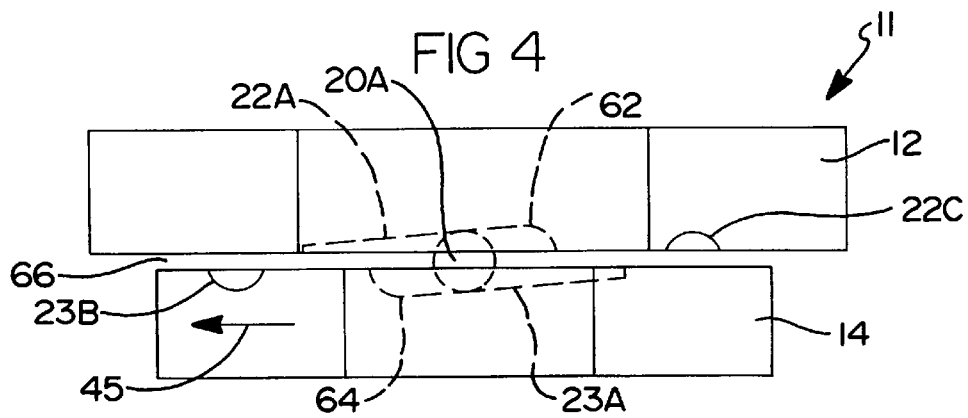
FIG. 4 is a cross-sectional view of the ball ramp mechanism of the present invention taken along line III—III of FIG. 2 with the ball ramp mechanism in an energized state.

Referring now to FIGS. 2, 3 and 4 to describe the operation of the ball ramp mechanism 11, a cross-sectional view of the ball ramp mechanism 11 is shown in FIG. 2 and views taken along line III—III of the actuation ring 12 and the control ring 14 separated by a spherical element 20A are shown in FIGS. 3 and 4. Three spherical rolling elements 20A,20B and 20C are spaced approximately 120° apart rolling in three ramps 22A,22B and 22C having a variable axial depth respectively as the control ring 14 is rotated relative to the actuation ring 12. Any number of spherical rolling elements 20A,20B and 20C and respective ramps 22A,22B,22C,23A,23B and 23C could be utilized depending on the desired rotation and axial motion of the ball ramp mechanism 11. It is mandatory to employ at least three spherical rolling elements 20A,20B and 20C travelling on a like number of identical equally spaced opposed ramps 22A,22B,22C,23A,23B and 23C formed respectively in both the control ring 14 and the actuation ring 12 to provide axial and radial stability to the control ring 14 and the actuation ring 12. As mentioned previously, any type of rolling elements could be utilized such as a ball or a cylindrical roller. The actuation ring 12 is shown which rotates with the flywheel 4, the pressure plate housing 16 and the thrust ring 34 turning about axis of rotation 47 coincident with the axis of rotation of the transmission input shaft 8.

Three semi-circular, circumferential ramps 23A,23B and 23C are shown formed in the face of the actuation ring 12 with corresponding identical opposed ramps 22A,22B and 22C formed in the face of the control ring 14. The control ring 14 and the actuation ring 12 are made of a high strength steel and the unidirectional tapered ramps 22A,22B,22C, 23A,23B and 23C carburized and hardened, to $R_c$55–60. The ramps 22A,22B,22C,23A,23B and 23C are tapered in depth as more clearly shown in FIG. 3 by references to ramps 22A and 23A and circumferentially extend for approximately 120° (actually less than 120° to allow for a separation section between the ramps). The separation 66 between the control ring 14 and the actuation ring 12 is determined by the rotational orientation between the two corresponding opposed ramps such as 22A and 23A where the spherical rolling element 20A rolls on both ramps 22A and 23A as the control ring 14 is rotated relative to the actuation ring 12 on the same axis of rotation. In a substantially identical manner, rolling element 20B rolls on both ramps 22B and 23B and rolling element 20C rolls on both ramps 22C and 23C. The relative rotation forces the two rings 14,12 axially apart or allows them to come closer together as determined by the position of the rolling elements 20A,20B and 20C or their respective ramp pairs 22A,23A and 22B, 23B and 22C, 23C thereby providing an axial movement for clamping and releasing the clutch disc 10 between the actuation ring 12 and the flywheel 4.

FIG. 3 illustrates the rotational orientation of the control ring 14 and the actuation ring 12 when the carrier ring 48 is at a minimum when the ramps 22A and 23A are at one extreme in alignment and the spherical element 20A is in the deepest section of the ramps 22A and 23A. Assuming there is a rotational speed difference the flywheel 4 and the transmission input shaft 8, upon energizing the coil 30, the control ring 14 is rotated relative to the actuation ring 12 by application of a rotational torque input through the control friction disc 27 and the ramps 22A and 23A move relative to one another causing the spherical element 20A to roll on each of the ramp surfaces 22A and 23A moving to a different position on both ramps 22A and 23A thereby forcing the control ring 14 and the actuation ring 12 apart to a wider separation 66 as shown in FIG. 4. A similar separation force is generated by rolling element 20B rolling on ramp surfaces 22B and 23B and by rolling element 20C rolling on ramp surfaces 22C and 23C. The rotation of the control ring 14 is clearly illustrated by reference to FIGS. 3 and 4 by the relative shift in position of reference points 62 and 64 from directly opposed in FIG. 3 to an offset position in FIG. 4 caused by rotation of the control ring 14 in the direction of the arrow 45. This increase in axial displacement can be used for a variety of applications, and especially driveline clutches, since the force level relative to the torque applied to the control ring 14 is quite high, typically a ratio of 100:1. This can be used as illustrated in this application to load an actuation ring 12 against a clutch disc 10 and flywheel 4 in a vehicle driveline. Additional illustrative details of operation of a ball ramp actuator can be found by reference to U.S. Pat. No. 4,805,486.

If the flywheel 4 is rotating at the same speed as the transmission input shaft 8, even if the coil 30 is energized, the control ring 14 rotates at the same speed as the actuation ring 12 and no additional axial force is generated by the ball ramp mechanism 11 since there is no relative rotation between the control ring 14 and the actuation ring 12. Assuming the coil 30 remains energized thereby electromagnetically tying the control ring 14 to the transmission input shaft 8 through the friction disc 37, coil pole 32 and the planetary gearset 39, according to the present invention, any relative rotation between the flywheel 4 and the transmission input shaft 8, results in relative rotation between the control ring 14 and the actuation ring 12 in a direction which causes the spherical elements 20A, 20B and 20C to further increase the separation 66 between the control ring 14 and the actuation ring 12 thereby generating additional clamping force by the actuation ring 12 so as to use the power of the flywheel to increase the lock-up force on the clutch disc 10.

Figure 5:
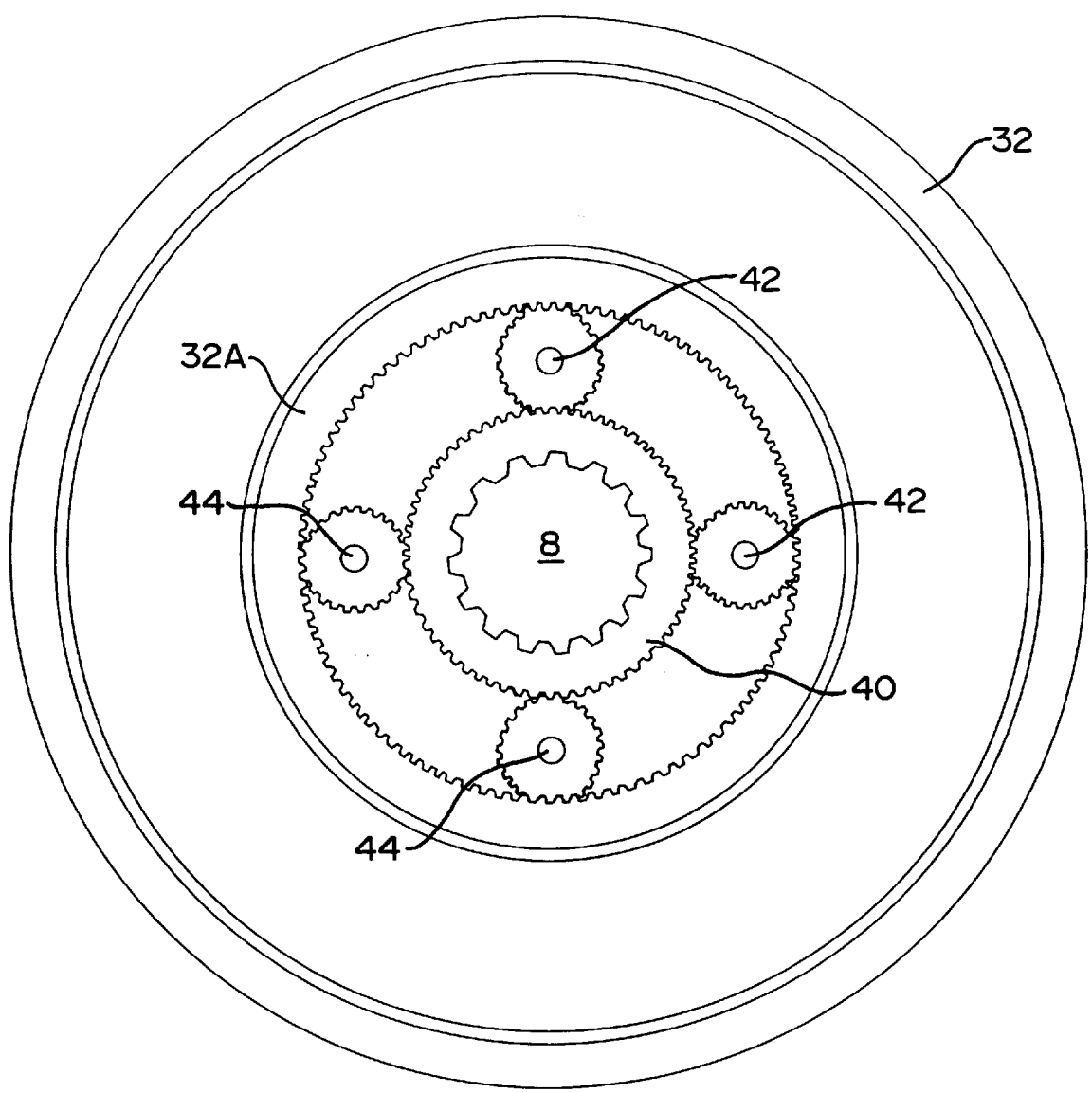
FIG. 5 is an axial cross-sectional view of the ball ramp actuator of the present invention taken along line V—V of FIG. 1.

Now referring to FIG. 5, a partial cross-sectional view of the present invention taken along line V—V of FIG. 1 is shown. The transmission input shaft 8 is nonrotatably connected to the sun gear 40 which meshes with the planet gears 42 which are rotatably supported on support pins 44. The pole extension ring 32A has inward facing gear teeth which mesh with the planet gears 42. The coil 30 (not shown) is contained within the coil ring 32. Any number of planet gears 42 can be utilized.

The vehicle driveline clutch actuator can be used to couple a rotating input shaft to an output shaft where the input shaft would be analogous to the flywheel and the output shaft would be analogous to the transmission input shaft as shown in FIG. 1. The present invention would prevent the ball ramp mechanism 11 from retracting and disengaging the clutch disc 10 so long as the coil 30 was energized thereby providing a friction coupling between the input shaft (flywheel) and the output shaft (transmission input shaft) irregardless of the direction of the torque transfer.

This invention has been described in great detail, sufficient to enable one skilled in the art to make and use the same. Various alterations and and understanding of the foregoing specification, and it is intended to include all such alterations and modifications as part of the invention, insofar as they come within the scope of the appended claims.

We claim:

1. A ball ramp actuator for rotationally coupling two rotating elements comprising:

an input element driven by a prime mover and rotating about an axis of rotation;

an output element having an axis of rotation coaxial with said axis of rotation of said input element for rotating an output device;

a ball ramp mechanism for generating an axial movement comprising; an annular control ring having an axis of rotation, said control ring having a plurality of circumferential control ramps formed in a first face of said control ring, said control ramps varying in axial depth, an equivalent number of rolling elements one occupying each of said control ramps, an actuation ring having an axis of rotation coaxial with said axis of rotation of said control ring, said actuation ring having a plurality of actuation ramps substantially identical in number, shape and radial position to said control ramps where said actuation ramps at least partially oppose said control ramps and where each of said rolling elements is contained between one of said actuation ramps and a respective control ramp, said control ring being axially and rotationally moveably disposed relative to said actuation ring;

a planetary gearset having an annulus electromagnetically coupled to said control ring, and a sun gear rotatably driven by said output element where a plurality of planet gears couple said sun gear to said annulus;

a coil for inducing an electromagnetic field in said annulus;

a one-way clutch having an inner ring connected to said output element and an outer ring connected to said planet gears, said inner ring and said outer ring connected by a plurality of clutch elements;

where said one-way clutch prevents said control ring from rotating in a first direction relative to said actuation ring and said planetary gearset provides rotation of said control ring relative to said actuation ring in a second direction irrespective of the relative rotation of said input element and said output element.

2. The ball ramp actuator of claim 1, wherein said rolling elements are spherical.

3. The ball ramp actuator of claim 1, wherein said rolling elements are rollers.

4. The ball ramp actuator of claim 1, wherein said control ramps and said actuation ramps have a continuously increasing axial depth.

5. The ball ramp actuator of claim 1, wherein said coil is disposed adjacent to a coil pole.

6. The ball ramp actuator of claim 5, wherein said coil encircles said output element.

7. The ball ramp actuator of claim 6 further comprising a control unit electrically connected to said coil for supplying electrical energy to said coil.

8. The ball ramp actuator of claim 1, wherein said clutch elements are electromagnetically rotationally connected to said control ring.

9. The ball ramp actuator of claim 8, wherein said clutch elements are biased to allow said inner ring to rotate in either direction relative to said outer ring when said coil is non-energized.

10. The ball ramp actuator of claim 8, wherein said clutch elements are biased to prevent said control ring from rotating in a direction relative to said actuation ring tending to deactivate said ball ramp mechanism.

11. The ball ramp actuator of claim 1, wherein said input element is a flywheel and wherein said output element is a transmission input shaft and where said output device is a transmission.

* * * * *